(12) United States Patent
Gutå

(10) Patent No.: US 6,769,885 B2
(45) Date of Patent: Aug. 3, 2004

(54) PERISTALTIC PUMP, USE OF SAID PUMP, GUIDE PATH FOR USE IN A PERISTALTIC PUMP AND A METHOD OF LUBRICATING A PERISTALTIC PUMP

(76) Inventor: Bo Gutå, Box 66, Alvdalen (SE), SE-796 22

( * ) Notice: Subject to any disclaimer, the term of this patent is extended or adjusted under 35 U.S.C. 154(b) by 29 days.

(21) Appl. No.: 10/312,843
(22) PCT Filed: Jul. 4, 2001
(86) PCT No.: PCT/SE01/01537
§ 371 (c)(1), (2), (4) Date: Jan. 2, 2003
(87) PCT Pub. No.: WO02/02946
PCT Pub. Date: Jan. 10, 2002

(65) Prior Publication Data
US 2003/0180167 A1 Sep. 25, 2003

(30) Foreign Application Priority Data
Jul. 5, 2000 (SE) .............................. 0002532

(51) Int. Cl.[7] .......................... F04B 43/08; F04B 53/00; F04B 43/12
(52) U.S. Cl. ................. 417/474; 417/234; 417/477.3; 417/477.9; 417/477.12; 417/477.8
(58) Field of Search ............................... 417/234, 474, 417/477.3, 477.9, 477.12, 477.7, 477.6, 477.8; 184/16, 22

(56) References Cited

U.S. PATENT DOCUMENTS

| | | | |
|---|---|---|---|
| 1,589,044 A | * 6/1926 | Bouche | 417/234 |
| 2,909,937 A | * 10/1959 | Williams | 474/91 |
| 3,105,447 A | * 10/1963 | Robert | 417/475 |
| 3,431,864 A | 3/1969 | Jones | |
| 3,447,571 A | 6/1969 | Lejeune | |
| 3,887,306 A | * 6/1975 | Gerritsen | 417/477.12 |
| 4,012,177 A | * 3/1977 | Yakich | 417/477.8 |
| 4,110,061 A | * 8/1978 | Gerritsen | 417/477.12 |
| 4,184,815 A | 1/1980 | Casson et al. | |
| 4,315,718 A | * 2/1982 | Hogan | 417/477.3 |
| 4,408,688 A | * 10/1983 | Bieri | 198/500 |
| 4,540,350 A | * 9/1985 | Streicher | 417/475 |
| 4,568,255 A | * 2/1986 | Lavender et al. | 417/477.8 |
| 5,024,586 A | * 6/1991 | Meiri | 417/477.7 |
| 5,630,711 A | 5/1997 | Luedtke et al. | |

FOREIGN PATENT DOCUMENTS

| | | |
|---|---|---|
| GB | 2 084 287 | 4/1982 |
| WO | 01 18394 | 3/2001 |

* cited by examiner

Primary Examiner—Justine R. Yu
Assistant Examiner—Timothy P. Solak
(74) Attorney, Agent, or Firm—Young & Thompson

(57) ABSTRACT

A peristaltic pump (6) for pumping viscous media, comprises a housing (6A, 6B) having a wall (12) against which a hose (25) is placed, a shaft (7) that is centrally positioned in the housing and that carries a roller arm (13) having a roller (14) adapted to roll against and at the same time locally compress the hose (25) against the wall (12). A guide path (35) for the hose impregnated with lubricant is arranged in the housing of the pump. The invention also concerns an application of such a pump, a guide path for use in such a pump and a method of performing lubrication therein.

22 Claims, 7 Drawing Sheets

PERISTALTIC PUMP, USE OF SAID PUMP, GUIDE PATH FOR USE IN A PERISTALTIC PUMP AND A METHOD OF LUBRICATING A PERISTALTIC PUMP

TECHNICAL FIELD

The present invention relates generally to peristaltic pumps that are preferably used to pump viscous and/or polluted media.

BACKGROUND

Peristaltic pumps or hose pumps consist of a generally cylindrical housing in which an elastic or flexible hose is placed and arranged in a loop against a portion of the cylindrical wall, whereby the hose is typically arranged in a loop of about 180°. The hose forms a volume that is divided into a number of pump chambers by a pump unit that is arranged for rotation on a centrally positioned shaft in the housing. The pump unit supports one or more rollers or slide shoes that engage the hose and compress it to thereby divide the hose into suction and pressure chambers, respectively. On rotation of the pump unit, the rollers gradually transport the medium from an inlet to an outlet through peristaltic action. A major advantage of such a pump is that no parts of the pump other than the hose are in contact with the pumped medium, and for this reason hose pumps are used within many areas where this is of importance, from pumping sterile liquids in the medical field, for instance, to pumping polluted and/or aggressive media or sludge within the industry and other fields.

Typically, in all such applications the pump unit is provided with at least two rollers or slide shoes, thereby eliminating the need for non-return valves. An embodiment of this type is disclosed for instance in NO 144 977. However, the problem with such pumps is that the number of compressions of the hose during one revolution of the pump unit increases as the number of rollers increases, and that the useful life of the hose is thus reduced correspondingly.

In order to increase the useful life of the hose, it is suggested in SE 357 801 that the hose is arranged in a loop of up to 360°, with the two ends of the hose positioned on top of each other. The hose is acted on by one single roller having a corresponding length or height and consequently continuously engaging the hose. In this way, the need for non-return valves is eliminated, and at the same time the useful life of the hose may in theory be doubled as compared to a pump having two rollers.

The peristaltic pumps available on the market all focus on optimizing certain parameters that are important to the intended use. Thus, pumps to be used for example in the medical field are designed for low pressure ranges, and generally also with a low suction capacity. The employed hoses are generally made of a homogenous material, without reinforcement. Instead, priority is given to other features, such as exact dosing, sterility etc.

On the other hand, pumps that are employed in industry and within the building sector, for example for pumping concrete, are dimensioned for high pressure ranges to transport the respective medium a longer distance or to a greater height. However, they are practically always stationary and the pumped medium is supplied to the pump in such way that no powerful suction capacity is needed Since the pumps are stationary, they are moreover of a comparatively heavy and bulky design and thereby basically not suited for use in the field, such as for clean-up operations in nature.

A considerable contributory cause to the heavy and unwieldy design is the high demand for tightness of the pump housing, which is a consequence of the fact that the pumps are traditionally filled with a liquid lubricant, for example glycerine.

Furthermore, the hose of such pumps is designed to withstand the relatively high pumping pressures without rupture or excessive, elongation. An example of such a hose is given in U.S. Pat. No. 3,887,306, where a hose is described that, in addition to a conventional tensile rigid reinforcement consisting of wires crossing one another at a suitable angle, in certain areas is provided with a reinforcement consisting of reinforcing threads arranged in the longitudinal direction of the hose. This longitudinal reinforce Kent is positioned in the area where the rollers engage the hose and likewise has the purpose of preventing excessive elongation of the hose by the action of the rollers against the latter.

A peristaltic pump using pairs of rollers to compress the hose is described in EP 0 889 237 A2. According to this document is suggested a hose design that shall be very durable and in particular shall exhibit great resistance to the local stress imposed on it by the rollers. To achieve this, it is suggested that the hose be made entirely of one and the same rubber material that shall be resistant to wear and weather. In the rubber material, four layers of reinforcement are embedded that are all of the same general structure, having parallel wires of synthetic fibre cord that are preferably helically arranged around the hose. These cord layers solely aim to increase the durability of the hose and do not significantly contribute to alter the pumping properties thereof.

However, to our knowledge there has been no development aiming at optimizing this type of peristaltic pumps in order to make them more easy to handle and more suitable for mobile use.

SUMMARY OF THE INVENTION

The present invention eliminates the above drawbacks in an efficient and appropriate way.

A general object of the invention is to produce a practically useful solution to the problem of providing a light and easily maneuverable peristaltic pump that has optimized operational features and useful life.

Accordingly, a basic object of the invention is to find an easy and appropriate way of minimizing the weight and dimensions of a peristaltic pump while simultaneously optimizing its suction capacity as well as its discharge pressure capacity.

According to the invention, this is achieved by arranging a guide path against an inner wall of the pump housing, the guide path being provided with an upper surface adapted for supporting the hose and the guide track being impregnated with a lubricant. Hereby, the dimensions of the pump housing can be considerably reduced since it does not have to be made extremely tight to enclose a major amount of free-flowing lubricant, as is conventional.

According to one embodiment of the invention the guide path consists of cellular rubber forming a reservoir for the lubricant, whereby a further improved, long-term interval lubrication is achieved.

According to other embodiments the guide path consists of a support ramp having an upper surface that is formed with a slope for positioning the ends of the hose in planes above each other, the slope is formed as a screw pitch and the roller and the inner wall of the pump housing are provided with layers of a resilient material, such as polyurethane.

According to other embodiments of the invention the length of a roller arm that in the outer end carries a roller for compressing the hose, is linearly adjustable in a radial direction, and a special hose coupling is used to perform a retraction of the hose towards the pump housing during assembly. All of these embodiments contribute to facilitate mounting and dismounting of the very rigid and thick hose in the pump.

According to further embodiments of the invention, the hose of the pump is formed of different layers to adapt it to the intended application. According to the invention, these layers consist of inner and outer layers of rubber material adapted to be resistant to the substances and to the influence they may be subjected to, as well as of compression rigid and tensile rigid reinforcement layers, respectively (referred to below as "compression rigid" and "elongation rigid" layers) and a thick layer of highly resilient or elastic material having low attenuation, serving as the "muscle" of the hose to achieve the desired suction capacity of the peristaltic operation and being arranged between said inner and outer layers. Thereby, is obtained a pump that may so to speak be tailored for different situations requiring optimized suction, pressure and physical properties.

According to still another embodiment the compression rigid reinforcement layer consists of cord material having cord of macrofilament crossing at an angle of about 120°, each at an angle of about 60° to the central axis of the hose, and the elongation rigid reinforcement layer consists of tensile rigid cord material of polyester cord crossing at an angle of about 108°, each at an angle of about 54° to the central axis of the hose. Such an embodiment optimizes the resistance to elongation of the hose as well as its ability to spring back and to withstand compression.

According to another embodiment of the invention, the different layers of the hose are arranged in an optimal order to provide the best efficiency possible. Outside the inner durable layer consisting of a first synthetic material, is arranged a first layer of the compression rigid cord material, then the layer of highly elastic material, a second layer of the compression rigid cord material and, adjacent to the outer durable layer consisting of a second synthetic material, the layer of elongation rigid cord material.

According to a further embodiment of the invention, the hose is dimensioned to provide maximum suction capacity while accepting solid particles of considerable size in the pumped medium, without being damaged thereby. For this purpose it exhibits a relationship between inner and outer diameter of <0.56 and the layer of highly elastic or resilient material has a thickness of at least about 30% of the thickness of the hose wall.

Further embodiments of this first aspect of the invention are specified in the corresponding, dependent claims.

According to another aspect of the invention, it is suggested to use a pump according to the invention in mobile equipment for clean-up operations in remote areas.

According to yet another aspect of the invention a guide path is suggested that is intended to be arranged in the housing of a peristaltic pump for supporting and guiding the pump hose and at the same time providing lubricant primarily to the hose and the roller.

Embodiments of this aspect of the invention are evident from the accompanying dependent claims, According to still another aspect of the invention is suggested a method to guarantee satisfactory lubrication of the hose and the roller in a peristaltic pump of mentioned type.

More specifically, it is suggested according to this aspect that an intermittent lubrication that is controlled by the engagement between the roller and the hose is accomplished by forming a lubricant reservoir in a yielding guide path for the hose.

Embodiments of this aspect of the invention are evident from the accompanying dependent claims.

These and other objects of the invention are achieved by the invention as defined in the appended claims.

Briefly, the present invention provides the following advantages:

The pump can be designed to be light and easily maneuverable, adapted to mobile equipment; while offering an Improved possibility for interval lubrication of the hose and the roller;

Optimization of the suction capacity of the pump;

At least maintained discharge pressure capacity; and

Long useful life;

Allows comparatively simple mounting and dismounting of a very rigid hose in the pump.

Further objects, features and advantages of the present invention, as well as further embodiments thereof, are evident from the dependent claims and from the following description of exemplary embodiments.

DESCRIPTION OF THE DRAWINGS

A more detailed description of the invention is given below, taken together with the accompanying drawings, in which.

DESCRIPTION OF EXEMPLARY EMBODIMENTS

Referring primarily to FIGS. 1, 2, 3, 4A and 4B the basic principles of the invention will now initially be described by means of a first embodiment. At the same time, the differences compared to previous designs will be explained.

Figure 1:
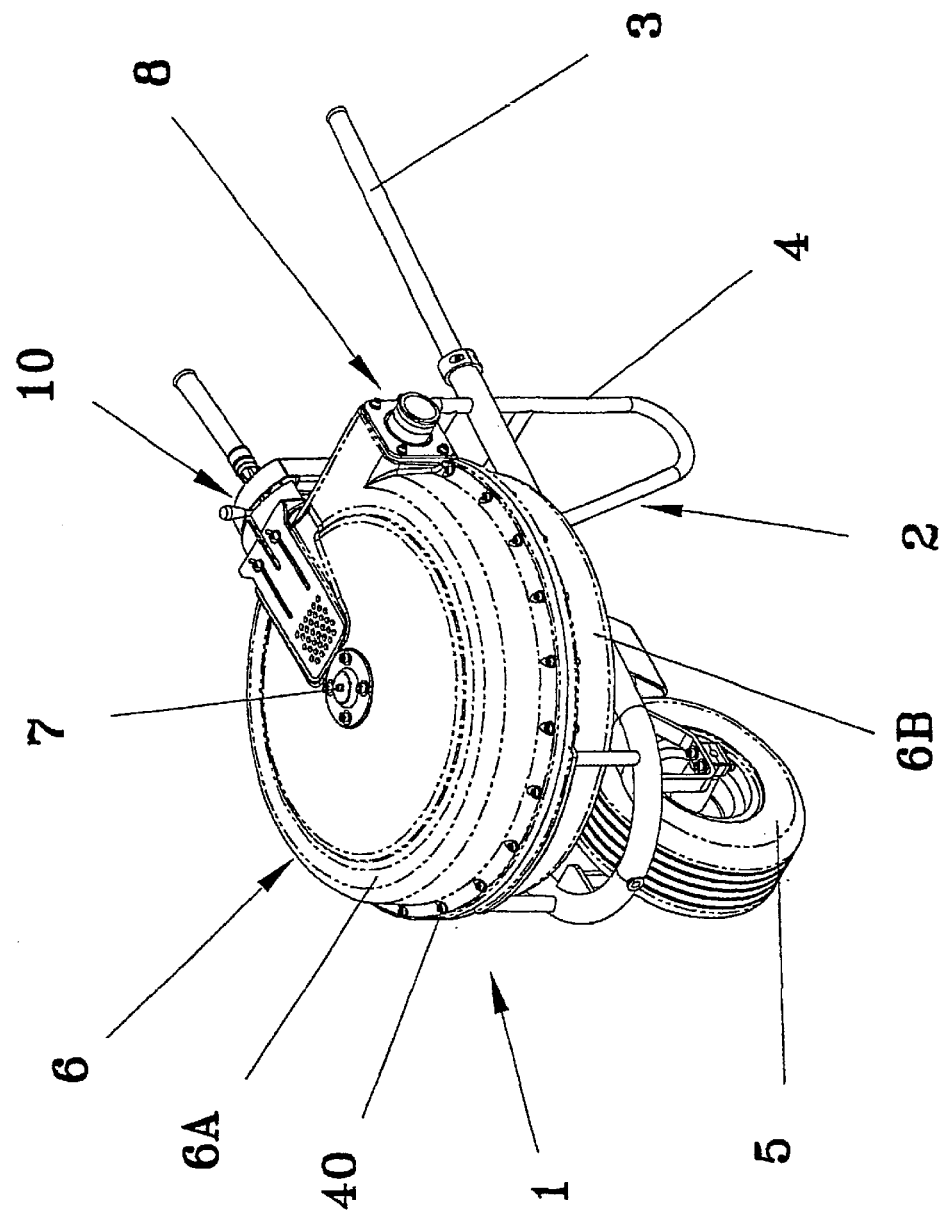
FIG. 1 is a perspective view of mobile clean-up equipment using a pump according to the invention.
Figure 2:
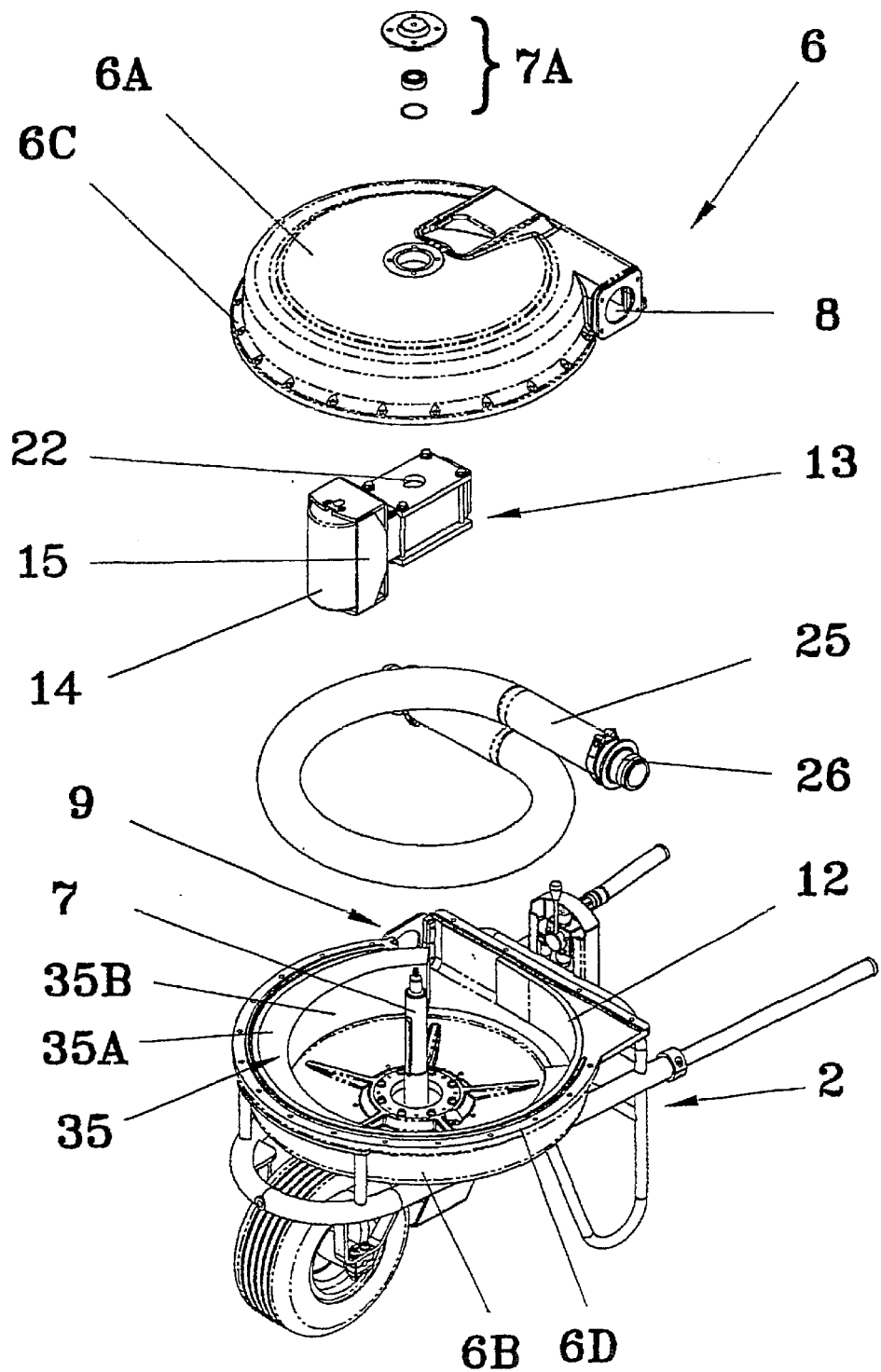
FIG. 2 is an exploded view of the equipment in FIG. 1, illustrating the main parts of the pump according to the invention.

FIGS. 1 and 2 illustrate a peristaltic pump 6 according to the invention in an embodiment as mobile equipment 1 preferably intended for clean-up operations in nature. Examples of such applications are clean-up operations at oil spill and other environmental pollution, often in remote areas not possible to reach with conventional slurry exhausters. In such cases it is required that highly viscous and possibly polluted media can be sucked up and then be discharged and transported a considerable distance.

For this purpose the pump 6 is mounted in a frame 2 forming handles 3 as well as supports 4 and an attachment for a wheel 5. In this embodiment the pump 6 can thus be transported as a wheelbarrow and used at places where there is no roadway.

The pump 6 is formed by upper and lower housing halves 6A and 6B that are supported in the frame 2 and that are assembled by means of bolt connections 40 at outer connecting flanges 6C, 6D on the housing halves 6A, 6B. The housing halves form a substantially cylindrical housing having a wall 12, the inner surface of which forms a support surface for a hose 25 that is arranged in a loop in the housing. More specifically, the hose 25 is arranged in a loop of more than 360°, i.e. the ends of the hose 25 are crossed, the arrangement as such being known through the initially mentioned document SE 357 801. Using hose couplings 26, described further below, the ends of the hose are mounted at an inlet 9 and an outlet 8, respectively, at the lower housing half 6B and tho upper housing half 6A, respectively, being directed in substantially opposite directions. This arrangement is in particularly advantageous for the described type of clean-up operations.

Centrally in the housing 6A, 6B is arranged a drive shaft 7 that is mounted in bearings in the upper housing half 6A as well as in the lower housing half 6B, whereby only the upper bearing 7A is illustrated in detail in FIG. 2. The drive shaft 7 is driven in a way not further illustrated by a drive assembly 10 that does not in itself constitute part of the invention and that is accordingly not further described here. However, in the embodiment disclosed herein a hydraulic drive unit is preferably used to drive the pump. A combustion engine or an electrical motor preferably drives the hydraulic drive unit.

Figure 5A:
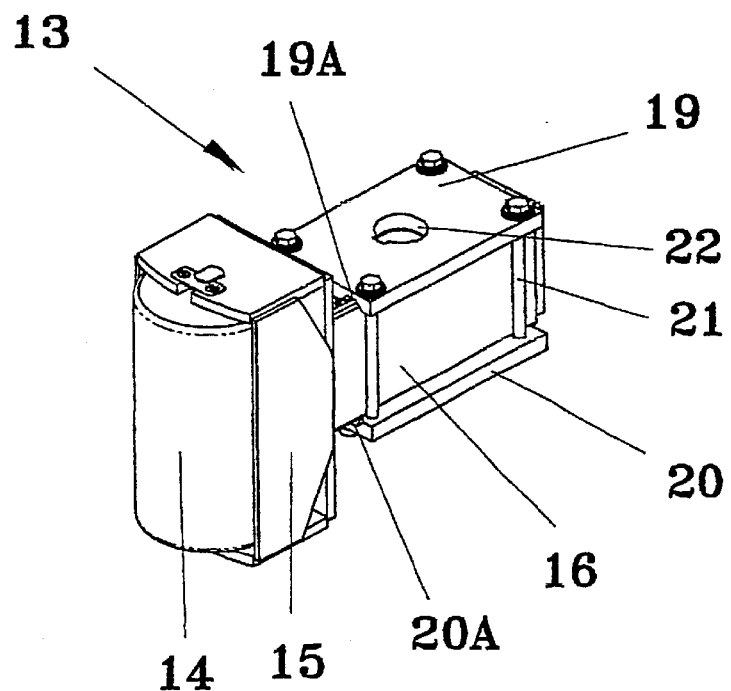
FIGS. 5A–B is a perspective and a cross-sectional view, respectively, of the roller arm in the pump according to the invention.
Figure 5B:
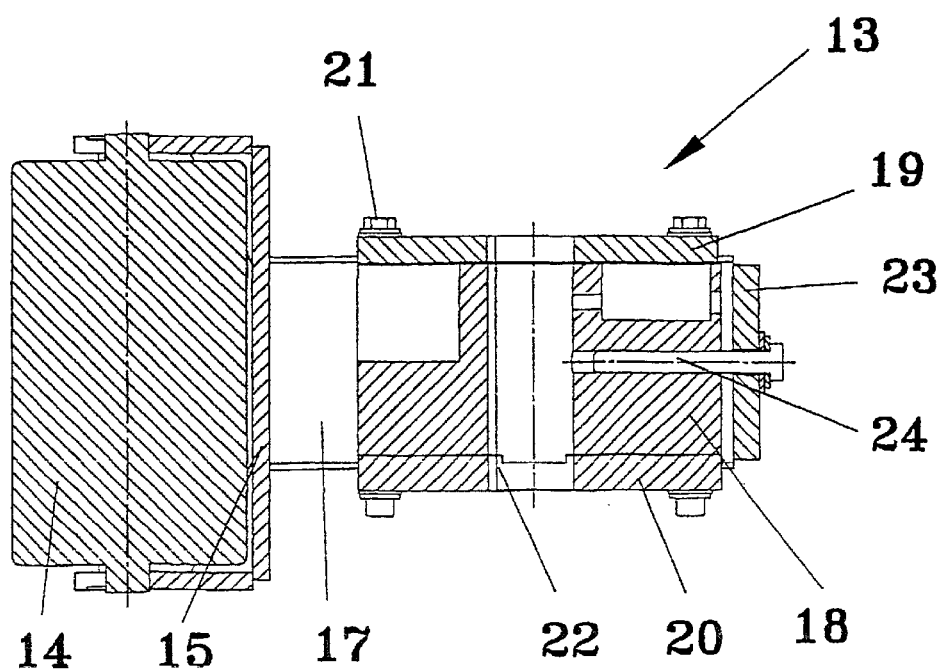

A roller arm 13 is mounted on the drive shaft 7, fixed to rotate with the shalt, preferably through a keyway-connection between the shaft 7 and a through bore 22 in the roller arm 13. In the outer end, the roller arm 13 carries a roller holder 15 with a roller 14 rotationally mounted therein and adapted to locally compress the hose 25 to produce the peristaltic pumping action upon rotation of the drive shaft 7, in the way described above. The inner side of the housing 6A, 6B as well as the roller 14 are preferably covered by a resilient material, such as polyurethane, to contribute to allowing pollutants in the form of solid particles of a size of up to 40 mm diameter to pass without damaging the hose 25 or the mechanical parts of the pump 6. To allow relief of the hose 25 during operational interruption and to facilitate mounting of the hose the roller arm 13 is radially adjustable with respect to the drive shaft 7, as will be described further below with reference to FIGS. 5A and 5B.

Since the ends of the hose are crossed, the hose extends with a pitch or slope along the housing wall 12, and in order to support the hose 25 in this path a "support ramp" 35 is arranged adjacent to the inner surface of the housing wall 12 of the lower housing half 6B. The hose 25 rests against an upper surface 35A of the support ramp 35, which is consequently performed having a "screw pitch". The support ramp 35 is made of a yielding material, for example cellular rubber, to be able to give way during compression of the hose 25 and then return to its original shape. For the purpose of strengthening the support ramp 35 and of increasing its ability to return to the original shape it is preferably covered with a not specifically illustrated durable material, such as polyurethane, at all sides except the one 35B facing the roller.

For this type of pump, lubrication of the hose is essential to obtain a long useful life of the hose. In many previous applications, the lubrication has been solved by making the housing of the pump completely tight and by filling it with a lubricant. However, such a solution results in a heavy and bulky pump that is above all suitable for stationary operation, and especially not for the above-discussed situations of oil clean-up in remote areas. In such cases, mobile equipment has to have as low weight as possible and must be easy to handle and to maneuver. According to the invention, it is therefore suggested that the support ramp 35 is impregnated with a suitable lubricant that does not affect other materials of the ramp 35, the hose 25 or the roller 14. This solution offers an advantageous optimization of the lubrication interval since, for each revolution lubricant is conveyed from the reservoir of the support ramp. Via the uncovered side 35B of the ramp, lubricant is fed to the hose 25 and to the roller 14. Furthermore, this solution contributes to making a comparatively light and easily maneuverable pump housing design.

In order to achieve the basic objects, i.e. a strong suction effect that allows lifting highly viscous and polluted media, in combination with a high conveying capacity and an appropriate useful life of the hose, the pump 6 uses a very strong hose 25, i.e. a hose presenting a strong "muscle" for the peristaltic action and at the same time a great resistance to high discharge pressures and to the impact of the roller. Here, the expression that the hose shall have a strong muscle means that it shall exhibit a great spring-back force with "dynamical" properties to generate the required negative pressure at the inlet and thereby to provide a large suction capacity. For these reasons, the hose according to the invention is formed of a series of different layers giving the hose a combination of different properties that are important to the intended fields of application.

Figure 3:
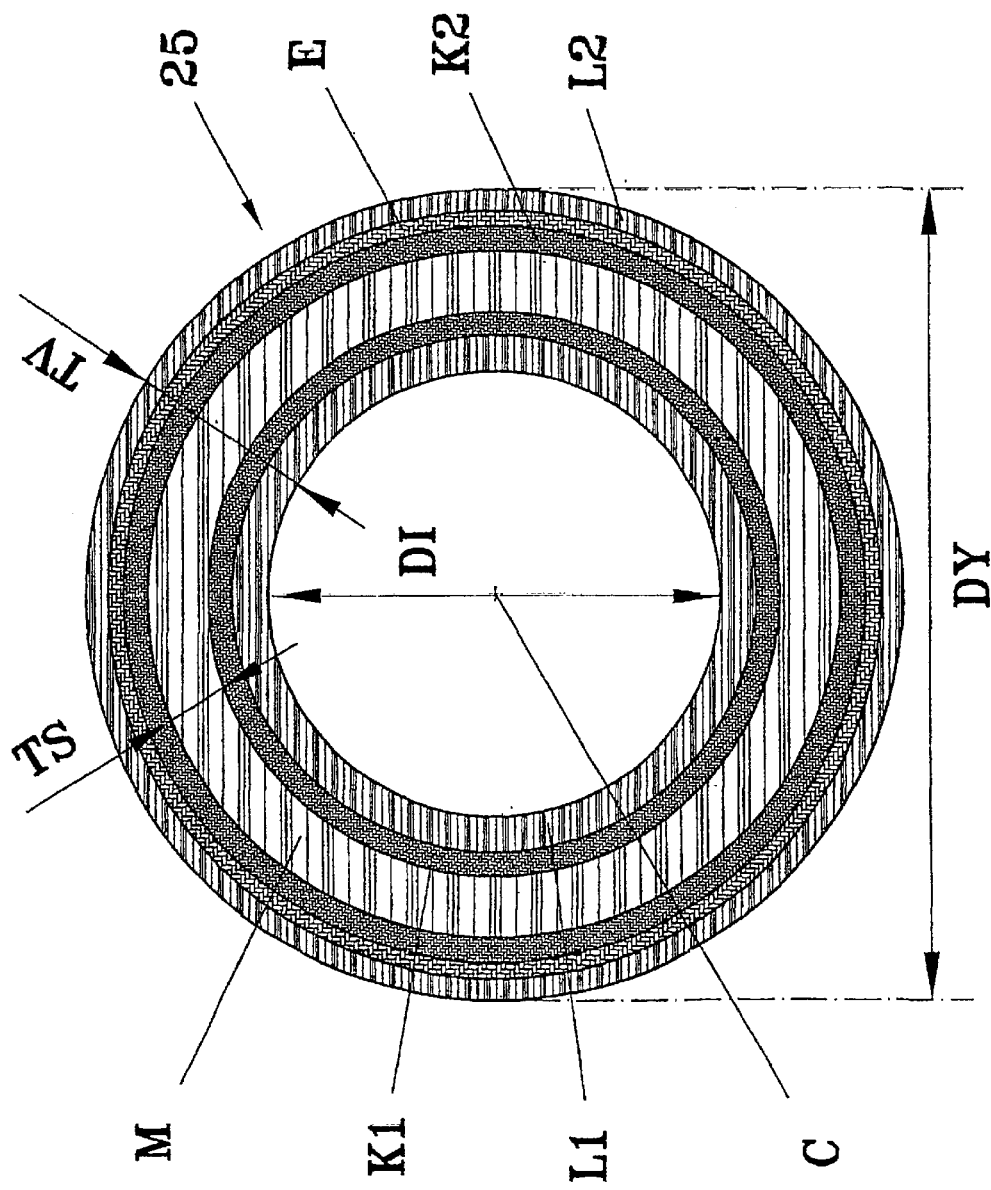
FIG. 3 is a schematical cross-sectional view of an embodiment of a hose used in the pump according to the invention.

Thus, in the embodiment illustrated in FIG. 3 the hose 25 comprises an inner layer L1 that shall be resistant to the pumped medium. In the intended clean-up applications for the pump 6 of the illustrated embodiment, nitrile rubber is a suitable choice of material, but other materials may be present in other applications where other specific media are pumped. Outside the first-mentioned layer is arranged reinforcement in the form of a first compression rigid layer K1 of cord material. The cord material consists of wires crossed in a way further specified with reference to FIG. 4B. This layer K1 above all contributes to providing good spring back properties and a long useful life of the hose 25.

Outside the first compression rigid layer K1 is arranged the "muscle" of the hose in the form of a layer M of highly elastic or resilient material with low attenuation, providing good spring back and at the same time a long useful life. The material of the "muscle layer" is preferably natural rubber or a material with corresponding properties. This layer M is the thickest, having a thickness TS of at least 30% of the wall thickness TV of the hose 25, and thereby it also contributes to allowing solid particles of the above given size to pass without damaging the hose 25.

Then follows a second compression rigid layer K2 that is advantageously formed in the same way as the first layer. Then follows reinforcement in the form of an elongation rigid layer E of cord material, again having crossed wires that are here crossed in a way that is further specified with reference to FIG. 4A. Finally, the hose 25 is provided with an outer layer L2 of a material resistant to wear, to ultra-violet radiation and to substances, such as oil, occurring in the intended application. In the exemplary embodiment where the pump 6 is intended to be used for instance for oil clean-up operations, chlorophrene rubber or alternatively polyurethane is a suitable material.

This general composition of the hose 25, with the mentioned layers presenting their different properties, is important for obtaining the desired properties. However, it should be emphasized that it is possible to vary the exact mutual positions of the different reinforcement layers K1, K2, E and of the "muscle layer" M in the hose.

However, performed tests have shown that it is possible to obtain particularly good results using a hose having a relationship between inner diameter D1 and outer diameter DY below 0.56 and a layer M of highly elastic or resilient material having a thickness TS that is between about 30–35% of the wall thickness TV of the hose 25, especially for hoses having an outer diameter of up to 100–120 mm.

Below follows an example of one such specific design of the hose according to the invention that in test has shown particularly advantageous for the application of the invention illustrated in the drawings, by clean-up operations in nature. In this case, the hose had an outer diameter DY of 92 mm and an inner diameter DI of 50.8 mm, i.e. a relationship between DI and DY of about 0.55.

The composition and the different layers of the hose are clear from the below table:

| LAYER | MATERIAL | THICKNESS | HARDNESS | POSITION (from centre) |
| --- | --- | --- | --- | --- |
| L1 | Nitrile rubber | 4 mm | 60 Shore A | 1 |
| L2 | Chloroprene rubber | 2.4 mm | 60 Shore A | 6 |
| M | Natural rubber | 7 mm | 60 Shore A | 3 |
| K1 | Macrofilament | 2.6 mm | — | 2 |
| K2 | Macrofilament | 2.6 mm | — | 4 |
| E | Polyester | 2 mm | — | 5 |

Thus, the wall thickness TV of the hose was 20.6 mm and the thickness TS of the highly elastic layer M was about 34% of the wall thickness TV of the hose.

Figure 4A:
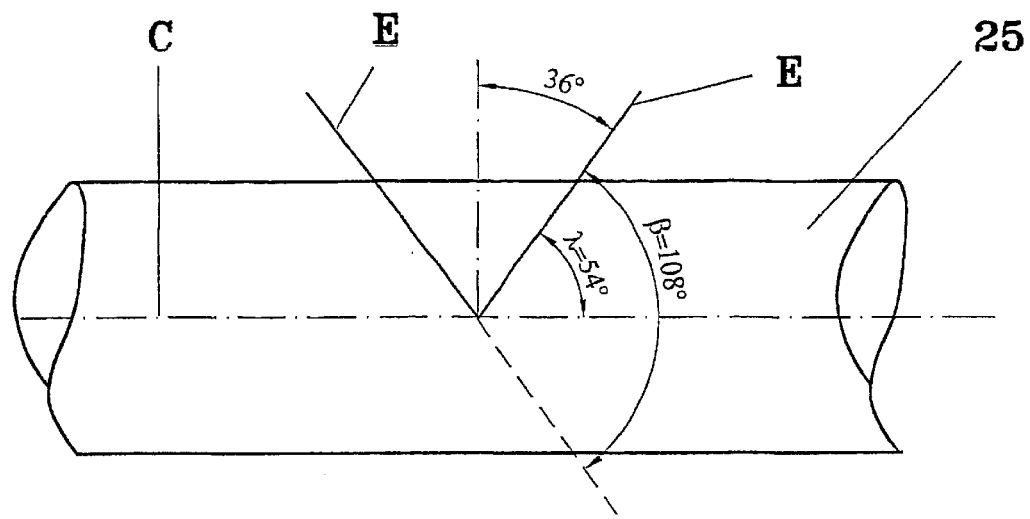
FIG. 4A is a schematical illustration of the embodiment of the elongation rigid cord layer in the hose according to FIG. 3.
Figure 4B:
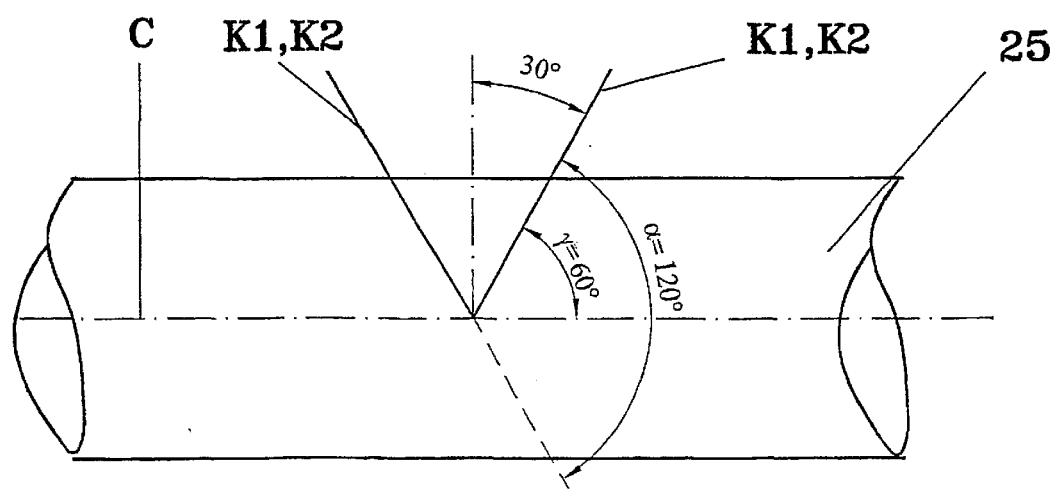
FIG. 4B is a schematical illustration of the embodiment of the compression rigid cord layers in the hose according to FIG. 3.

As illustrated in FIG. 4A, the polyester cord in the elongation rigid layer E was crossed at a mutual angle β of about 108°, each at an angle λ of about 54° to the central axis C of the hose. The compression rigid layers K1, K2, where the cord was crossed at an angle α of about 120°, each at an angle γ of about 60° to the central axis C of the hose 25, are shown in FIG. 4B.

With this hose a suction capacity of −1 bar and simultaneously a discharge pressure capacity of 10 bar was achieved in the pump according to the invention, at a rotation speed of 45 rotations per minute, and this well meets the set goals.

The described design of the hose in turn leads to a very stiff hose that is difficult to mount in the housing and to replace. The reason for this is partly that the hose is arranged in a 360° loop in the housing, but moreover the very thick and stiff hose 25 would have to be completely compressed to be possible to mount between the wall 12 and the roller 14 that is adapted to continuously engage the hose. More specifically, a force of about 700 kp would be required to compress a hose with the composition described in the example.

For the purpose of eliminating the need for special, very heavy tools to achieve this compression of the hose, it is suggested according to the invention, as mentioned above, that the roller arm is designed having a linearly adjustable length. The design of the roller arm 13 is most clearly illustrated in FIGS. 5A and 5B, where it is evident that the roller arm 13 has a stationary unit that through the keyway-connection is mounted on the shaft 7, fixed to rotate with the shaft. Said unit comprises a block 18 surrounded by upper and lower guide plates 19 and 20, respectively, that can be clamped towards each other by means of clamp bolts 21. In the sides facing each other, the guide plates 19, 20 are provided with guide grooves 19A, 20A for slidable but lockable reception of guide bars 16, 17 extending from the roller holder 15. Thus, the upper and lower guide plates 19 and 20, respectively, are clamped against the slide bars 16, 17 to fix these in position and thereby to fix the length of the arm after adjustment.

An adjusting plate 23 engages the rear ends of the slide bars 16, 17, i.e. on the opposite side of the pump shaft 7 compared to the roller 14. An adjusting screw 24 having a fine pitch extends through the adjusting plate 23 and can be screwed into the block 18 to cause a radial adjustment of the roller holder 15 relative to the pump shaft 7 by pressing against the ends of the slide bars. After adjustment the bars are locked by clamping together the guide plates 19, 20 using the clamp bolts 21. Through the fine pitch of the adjusting screw 24, the necessary force to compress the hose can be obtained without any major problem. As hinted above the adjustability is not only important for mounting/dismounting, but it is also important to be able to relieve the pressure on the hose during long-time storage. After cold storage, when the rubber materials may be brittle, it is advantageous to make a gentle start-up in the sense that the roller arm is adjusted for only partial compression of the hose. The pump is then run a number of revolutions until the hose softens, and then the arm is extended for complete hose compression.

Figure 6B:
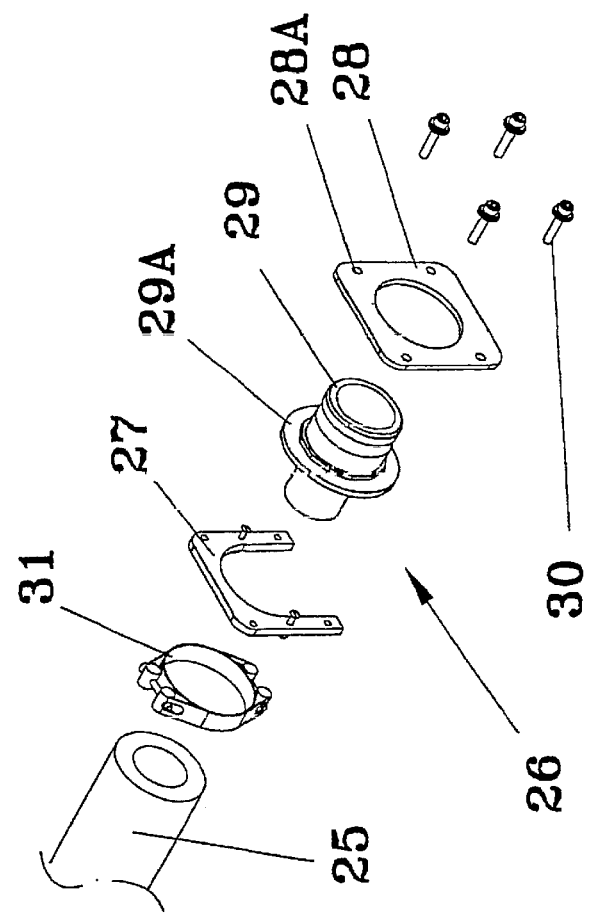
FIGS. 6A–C is a perspective, an exploded and a cross-sectional view, respectively, illustrating a hose coupling in the pump according to the invention.
Figure 6A:
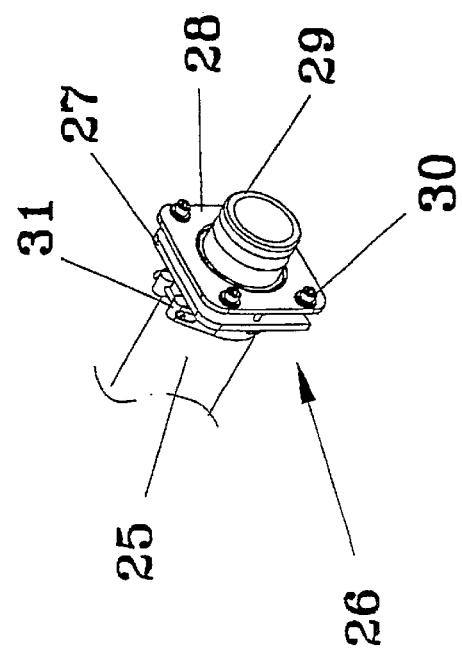
Figure 6C:
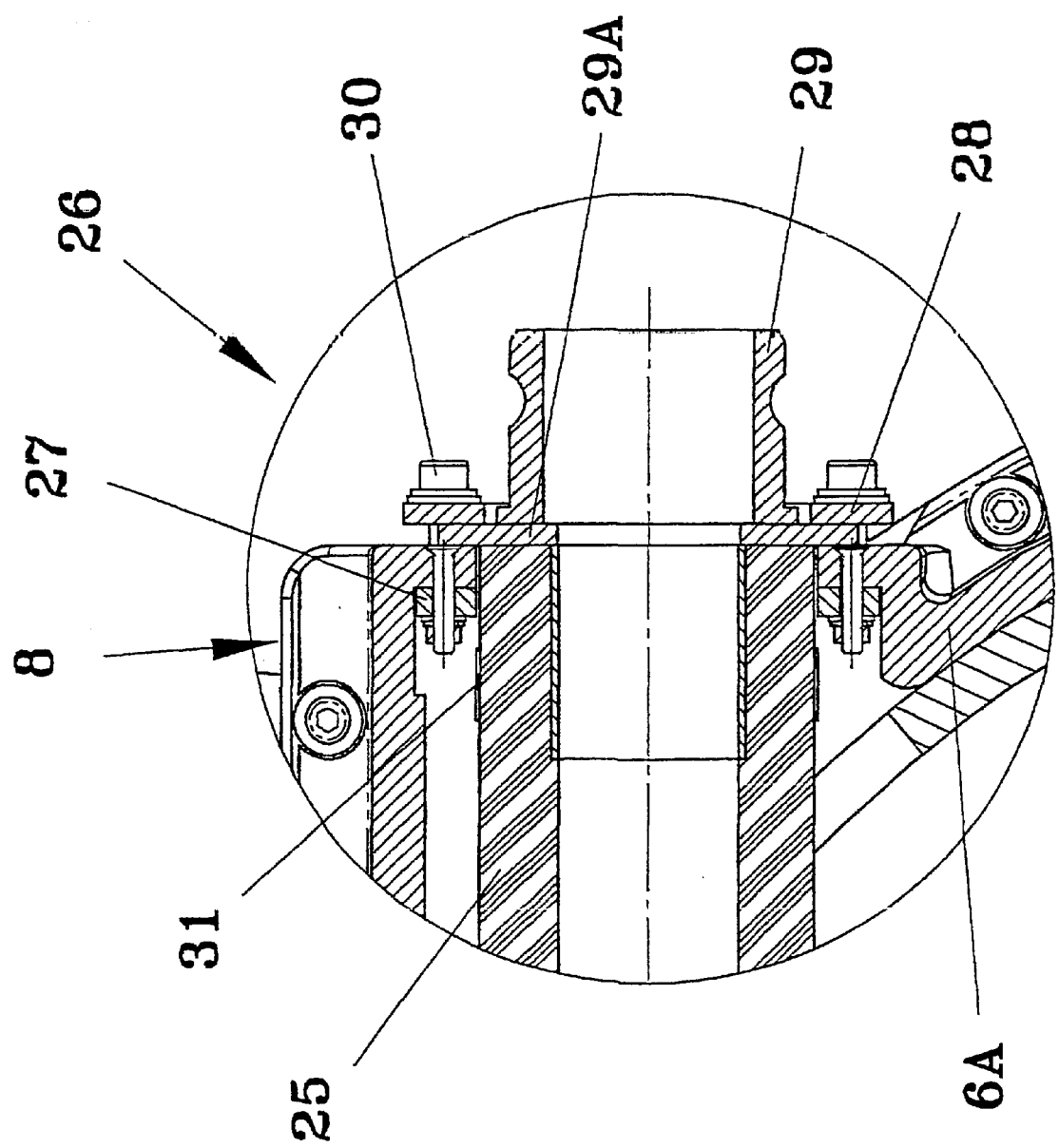

It is also difficult to mount the thick and rigid hose in the housing with the described shape of a loop exceeding 360°. More specifically, as the hose is positioned against the inner wall 12 during assembly it is necessary to let the ends protrude through inlet 9 and outlet 8. The invention suggests that specific hose couplings 26 are then employed to enable connection of the ends of the hose to the inlet and the outlet, respectively. By means of said hose couplings the large forces necessary to position the ends correctly in the inlet and outlet, respectively, can easily be produced. Such a hose coupling is illustrated in detail in FIGS. 6A–C.

The hose coupling 26 comprises an inner retaining plate 27 screwed onto the inside of the wall 12 of the pump housing 6A, 6B at the inlet 9 and the outlet 8, respectively. A socket 29 is insertable into the end of the hose 25 placing the hose end against a flange 29A of the socket. A hose clamp 31 may be provided to lock the hose end to the socket 29. Furthermore, the hose coupling 26 comprises an outer retaining plate 28 adapted to be pushed onto the socket 29 from the outside, up to the flange 29A. Then, clamp bolts 30 are inserted into through bores 28A in the outer retaining plate 28 and into aligned through bores in the housing wall 12 of the pump, at the inlet 9 and the outlet 8, respectively, and into the inner retaining plate 27. Nuts are screwed onto the clamp bolts, on the inner side of the inner retaining plate. By tightening the clamp bolts 30 the socket 29, and thereby the hose end, are pulled towards the housing wall 12 at the inlet and outlet, respectively, since the outer retaining plate bears on the flange 29A. Thereby, the socket and the hose end ultimately engage the housing wall with the flange clamped between the housing wall 12 and the outer retaining plate 28. This connection of the hose to the outlet 8 of the housing 6A by means of the retaining plates also provides protection against the socket 29 being pushed out of the outlet 8 by a high pump pressure.

Although the invention has been described above with reference to an embodiment thereof particularly intended for mobile pump equipment for clean-up operations in difficult terrain, it should be emphasized that it also covers other variants using the basic principles of the invention. Thus, it is likewise possible within the scope of the invention to use these basic principles for a pump having a hose arranged in a loop of 180° and/or having more than one roller arm, even though it will slightly decrease the expected useful life.

The man skilled in the art recognizes that various modifications and changes can be made to the invention without departing from the scope thereof, as defined by the appended claims.

What is claimed is:

1. A guide path (35) for use in a peristaltic pump (6) of the type comprising a housing (6A, 6B) having a substantially cylindrical wall (12) against which an elastic hose (25) is arranged in a loop around the cylindrical wall, a roller (14) supported centrally in the housing on a roller arm (13) and adapted to roll against and at the same time locally compress the hose (25) against the wall (12), characterized in that said guide path has an upper surface (35A) against which the hose (25) is adapted to rest, in that the guide path (35) is made of a yielding material and in that it is impregnated with a lubricant.

2. A guide path (35) according to claim 1, characterized in that the guide path (35) consists of cellular rubber forming a reservoir for the lubricant.

3. A guide path (35) according to claim 1, characterized in that it is designed as a support ramp, the upper surface (35A) of which has a slope adapted to position the ends of the hose (25) in planes on top of each other.

4. A guide path (35) according to claim 3, characterized in that the upper surface (35A) is formed having a screw pitch.

5. A peristaltic pump (6) for pumping viscous and/or polluted media, comprising a housing (6A; 6B) having a substantially cylindrical wall (12) against which an elastic hose (25) is arranged in a loop around the cylindrical wall, a rotating shaft (7) centrally positioned in the housing and carrying an inner end of a roller arm (13) that at the outer end thereof is provided with a roller (14) adapted to roll against and at the same time locally compress the hose (25) against the wall (12), characterized by a guide path (35) placed against the wall (12) of the housing (6A, 6B) and having an upper surface (35A) against which the hose (25) rests, in that the guide path (35) is made of a yielding material and in that it is impregnated with a lubricant.

6. A pump (6) according to claim 5, characterized in that the guide path (35) consists of cellular rubber forming a lubricant reservoir.

7. A pump (6) according to claim 5, characterized in that the guide path (35) consists of a support ramp the upper surface (35A) of which has a slope adapted to place the ends of the hose (25) in planes on top of each other.

8. A pump (6) according to claim 7, characterized in that the upper surface (35A) of the guide path (35) has a screw pitch.

9. A pump (6) according to claim 5, characterized in that the roller (14) and the inner wall (12) of the housing (6A, 6B) are provided with a layer of a resilient material, preferably polyurethane.

10. A pump (6) according to claim 5, characterized in that the length of the roller arm (13) supporting the roller (14) at its outer end, is linearly adjustable in a radial direction with regard to the shaft (7).

11. A pump (6) according to claim 10, characterized in that the roller arm (13) is provided with a block (18) mounted on the shaft (7), fixed to rotate with the shaft, and upper and lower guide plates (19, 20) that can be clamped together and that in the sides facing each other are provided with guide grooves (19A, 20A) for slidable but lockable reception of guide bars (16, 17) extending from a roller holder (15).

12. A pump (6) according to claim 11, characterized by an adjusting plate (23) engaging rear ends of the guide bars (16, 17), on an opposite side of the pump shaft (7) compared to the roller (14), and by an adjusting screw (24) that has a fine pitch, that extends through the adjusting plate (23) and that is screwed into the block (18) for radial adjustment of the roller holder relative to the pump shaft.

13. A pump (6) according to claim 5, in which the hose (25) is arranged in a loop of at least 360° against the cylindrical wall (12), whereby the ends of the hose are connected to an inlet (9) and an outlet (8) of the pump (6), respectively, by means of a hose coupling (26), characterized in that the hose coupling (26) comprises a socket (29) insertable into and connectable to the hose (25) and by inner and outer retaining plates (27 and 28, respectively) adapted to clamp between them a flange (29A) of the socket (29) and the housing wall (12) of the pump at the inlet (9) and the outlet (8), respectively.

14. A pump (6) according to claim 13, characterized in that the inner retaining plate (27) is fixed to the inlet (9) and the outlet (8) of the pump (6), respectively, at the inside thereof, and in that clamp bolts (30) extend through the inner and outer retaining plates (27 and 28, respectively) and the housing wall (12) of the pump at the inlet (9) and outlet (8), respectively, whereby tightening of the clamp bolts (30) brings the flange (29A) of the socket (29) to lie against the inlet, clamped between the housing wall and the outer retaining plate (28).

15. A pump (6) according to claim 5, characterized in that the hose (25) is formed of an inner layer (L1) of a first synthetic material resistant to the pumped medium, an outer layer (L2) of a second synthetic material resistant to wear and to oil and ultraviolet radiation and therebetween at least one layer (K1, K2) of compression rigid cord material, a layer (E) of elongation rigid cord material and a layer (M) of highly elastic material with low attenuation.

16. A pump (6) according to claim 15, characterized in that the layer/layers (K1, K2) of compression rigid cord material comprises/comprise cord of macrofilament crossed at an angle ($\alpha$) of about 120°, each at an angle ($\gamma$) of about 60° to the central axis (C) of the hose (25) and in that the layer (E) of elongation rigid cord material comprises polyester cord crossed at an angle ($\beta$) of about 108°, each at an angle ($\lambda$) of about 54° to the central axis (C) of the hose.

17. A pump (6) according to claim 15, characterized in that outside the inner layer (L1) consisting of a first synthetic material, is provided a first layer (K1) of compression rigid cord material, then the layer (M) of highly elastic material, a second layer (K2) of compression rigid cord material and, adjacent to the outer layer (L2) consisting of a second synthetic material, the layer (E) of elongation rigid cord material.

18. A pump (6) according to claim 15, characterized in that the hose (25) has a relationship between inner diameter (DI) and outer diameter (DY) of <0.56 and in that the layer (M) of highly elastic material has a thickness (TS) of at least about 30% of the wall thickness (TV) of the hose.

19. The use of a pump (1) according to claim 5, in mobile equipment for clean-up operations in remote areas.

20. A method of lubricating a peristaltic pump (6) for pumping viscous and/or polluted media and comprising a housing (6A, 6B) having a substantially cylindrical wall (12) against which an elastic hose (25) is arranged in a loop around the cylindrical wall, and a roller (14) supported centrally in the housing on a roller arm (13) and adapted to roll against and at the same time locally compress the hose (25) against the wall (12), the method comprising arranging in the housing a guide path (35) made of a yielding material for the hose (25) adjacent to the substantially cylindrical wall (12) and forming a lubricant reservoir in the guide path by impregnating it with the lubricant, thereby providing an intermittent lubrication of the hose and the roller controlled by the rolling of the roller against the hose.

21. A method according to claim 20, characterized in that the guide path (35) is designed as a support ramp for the hose (25), and is formed having an upper surface (35A) against which the hose (25) is adapted to rest and that is formed with a screw pitch.

22. A method according to claim 20, characterized in that the guide path (35) is made of cellular rubber.

* * * * *